United States Patent
Sezai et al.

(10) Patent No.: US 6,773,619 B2
(45) Date of Patent: Aug. 10, 2004

(54) MAGNETIC CORE FOR TRANSFORMER, MN-ZN BASED FERRITE COMPOSITION AND METHODS OF PRODUCING THE SAME

(75) Inventors: Yuji Sezai, Tokyo (JP); Ippou Hirai, Tokyo (JP); Masahiko Watanabe, Tokyo (JP)

(73) Assignee: TDK Corporation, Tokyo (JP)

(*) Notice: Subject to any disclaimer, the term of this patent is extended or adjusted under 35 U.S.C. 154(b) by 17 days.

(21) Appl. No.: 10/193,167

(22) Filed: Jul. 12, 2002

(65) Prior Publication Data

US 2003/0116746 A1 Jun. 26, 2003

(30) Foreign Application Priority Data

Jul. 17, 2001 (JP) .......................................... 2001-216083
Sep. 6, 2001 (JP) .......................................... 2001-269721
Apr. 9, 2002 (JP) .......................................... 2002-105894

(51) Int. Cl.[7] ............................. H01F 1/34; H01F 17/04
(52) U.S. Cl. ............................... 252/62.62; 252/62.63; 252/62.59
(58) Field of Search ............................ 252/62.62, 62.63, 252/62.59

(56) References Cited

U.S. PATENT DOCUMENTS

| | | | | |
|---|---|---|---|---|
| 6,423,243 B2 | * | 7/2002 | Inoue | 252/62.62 |
| 2002/0053654 A1 | * | 5/2002 | Sezai et al. | 252/62.56 |

FOREIGN PATENT DOCUMENTS

| JP | B2 52-4753 | | 2/1977 |
|---|---|---|---|
| JP | 03-050124 | * | 3/1991 |
| JP | B2 4-33755 | | 6/1992 |
| JP | A 4-336401 | | 11/1992 |
| JP | 05-058721 | * | 3/1993 |
| JP | 05-217733 | * | 8/1993 |
| JP | A 6-151151 | | 5/1994 |
| JP | A 6-263447 | | 9/1994 |
| JP | 06-290925 | * | 10/1994 |
| JP | A 6-290925 | | 10/1994 |
| JP | A 6-290926 | | 10/1994 |
| JP | A 7-94314 | | 4/1995 |
| JP | A 7-169612 | | 7/1995 |
| JP | A 7-201582 | | 8/1995 |
| JP | A 7-201585 | | 8/1995 |
| JP | A 7-201588 | | 8/1995 |
| JP | A 7-201589 | | 8/1995 |
| JP | A 7-201590 | | 8/1995 |
| JP | A 7-211530 | | 8/1995 |
| JP | A 7-278764 | | 10/1995 |
| JP | A 7-297034 | | 11/1995 |
| JP | A 8-85821 | | 4/1996 |
| JP | A 8-97045 | | 4/1996 |
| JP | A 8-191011 | | 7/1996 |
| JP | A 9-246034 | | 9/1997 |
| JP | A 9-326310 | | 12/1997 |
| JP | A 10-12447 | | 1/1998 |
| JP | A 10-050512 | | 2/1998 |
| JP | A 10-335130 | | 12/1998 |
| JP | A 11-176643 | | 7/1999 |
| JP | A 11-186044 | | 7/1999 |
| WO | WO 01/22440 | * | 3/2003 |

* cited by examiner

Primary Examiner—C. Melissa Koslow
(74) Attorney, Agent, or Firm—Oliff & Berridge, PLC

(57) ABSTRACT

An Mn—Zn based ferrite composition having a main component comprised of $Fe_2O_3$: 51.5 to 54.5 mol %, ZnO: 19.0 to 27.0 mol % and the rest of substantially MnO and a first sub component comprised of 0.002 to 0.040 wt % of $SiO_2$, 0.003 to 0.045 wt % of CaO and 0.010 wt % or less of P with respect to 100 wt % of the main component. In a magnetic core for a transformer comprised of this composition, the THD of the transformer becomes −84 dB or less in a broad frequency band, so it can be preferably used as a magnetic core, for example, for an xDSL modem transformer.

18 Claims, 5 Drawing Sheets

MAGNETIC CORE FOR TRANSFORMER, MN-ZN BASED FERRITE COMPOSITION AND METHODS OF PRODUCING THE SAME

BACKGROUND OF THE INVENTION

1. Field of the Invention

The present invention relates to a magnetic core for a transformer used in a high speed data communication modem in a digital subscriber line (generally called xDSL), such as an asymmetric digital subscriber line (ADSL) and a very high-bit rate digital subscriber line (VDSL), and a composition of the same, particularly relates to a magnetic core for a transformer which exhibits excellent total harmonic distortion (THD) characteristics of a transmission waveform in a broad frequency band and a wide temperature range at the time of data communication and a composition of the same.

2. Description of the Related Art

In recent years, in the field of electronics, equipments have been required to be made smaller in size, smaller in thickness and improved in performance. Furthermore, in the field of communication equipment, the impedance of the primary coil in the pulse transformer for interfacing with the Integrated Services Digital Network (ISDN) etc. has to be increased in a broad frequency band to improve the transmission characteristics. Therefore, the primary coil is required to have a high inductance. The I.430 and other standards of the ITU (International Telecommunication Union)-T required that at least 20 mH be secured for the inductance of the primary coil of the pulse transformer.

Further, to reduce the size and thickness of electronic equipments in this way, the transformer has to be made smaller and thinner. Therefore, the necessary inductance is secured by increasing the magnetic permeability of the material of the magnetic core used for the transformer (Japanese Unexamined Patent Publication (Kokai) No. 6-263447, Japanese Unexamined Patent Publication (Kokai) No. 7-94314, Japanese Unexamined Patent Publication (Kokai) No.7-169612, Japanese Unexamined Patent Publication (Kokai) No. 7-211530, Japanese Unexamined Patent Publication (Kokai) No.7-278764, Japanese Unexamined Patent Publication (Kokai) No. 7-297034, Japanese Unexamined Patent Publication (Kokai) No. 8-85821, Japanese Unexamined Patent Publication (Kokai) No. 8-97045, Japanese Unexamined Patent Publication (Kokai) No.9-246034, Japanese Unexamined Patent Publication (Kokai) No. 10-12447, and Japanese Unexamined Patent Publication (Kokai) No. 10-335130), reducing the thickness of the transformer (Japanese Unexamined Patent Publication (Kokai) No. 7-201582, Japanese Unexamined Patent Publication (Kokai) No. 7-201585, Japanese Unexamined Patent Publication (Kokai) No. 7-201588, Japanese Unexamined Patent Publication (Kokai) No. 7-201589, and Japanese Unexamined Patent Publication (Kokai) No. 7-201590), mirror-polishing the bonding surface in the case of a split-type magnetic core such as an EE shape (Japanese Unexamined Patent Publication (Kokai) No. 9-246034), etc.

Even in a transformer of a modem used for connecting a telephone line transmitting an analog signal and a data terminal or computer handling a digital signal, a high inductance is similarly required (Japanese Unexamined Patent Publication (Kokai) No. 11-176643 and Japanese Unexamined Patent Publication (Kokai) No. 11-186044).

Furthermore, due to the rapid spread of the Internet, a demand has risen for communication systems enabling higher speed communication of large quantities of data compared with the ISDN, etc. New communication systems called the xDSL (x digital subscriber line) have been developed. The ADSL (asymmetric digital subscriber line) and the VDSL (very high-bit rate digital subscriber line) enabling a higher communication speed, etc. are included in the xDSL technique.

The xDSL requires a modem for converting a digital signal to and from an analog signal and the modem requires a transformer for insulating from a line. In the xDSL technology, transmission speed is much higher (16 kb/s to 9 Mb/s in ADSL and 1.5 Mb/s to 52 Mb/s in VDSL) and the operating frequency band is also high (30 kHz to 1.1 MHz in ADSL and 1 MHz to 10 MHz in VDSL). Therefore, the transformer used for a modem may be reduced in the inductance for raising the impedance compared with the conventional transformers for ISDN. Accordingly, the magnetic permeability of the material of the magnetic core of the transformer may be made smaller than that in the past and mirror-polishing of the bonding surfaces is not required even in the case of a split-type magnetic core such as an EE shape.

On the other hand, in high speed data communications using such xDSL, the transformer used in the modem for transmitting a data signal at a high speed has to have a small distortion of the transmission waveform and a small noise and has to be reduced in the rate of occurrence of transmission error, so that a material of the magnetic core having a small THD is sought. Therefore, the loss in the AC magnetic field (the eddy current loss, the hysteresis loss, and the residual loss) has to be reduced.

Note that the THD means the ratio of the total harmonics and the noise component with respect to the basic signal of the input data at the time of data communication as expressed by the following equation (1), so the THD becomes smaller the smaller the distortion of the transmission waveform or the smaller noise.

$$THD(dB)=20 \log\{(\text{harmonics}+\text{noise})/(\text{basic wave}+\text{harmonics}+\text{noise})\} \quad (1)$$

As a material of a magnetic core for reducing the THD, the present inventors have developed an Mn—Zn based ferrite material described in the U.S. patent application Ser. No. 09/944,590 (corresponding to the Japanese Patent Application No. 2000-279101). The Mn—Zn based ferrite material filed as a prior application reduces the THD in a broad frequency band by specifying a range of its main composition, but there is a demand for one capable of reducing the THD in the broad frequency band from the other approach.

Furthermore, the Mn—Zn based ferrite material filed as a prior application reduces the THD in a wide temperature range (−40° C. to +85° C.) but becomes minimum at around −10° C. and the THD worsens to about several dB on the higher temperature side and on the lower temperature side of the temperature showing the minimum value. Thus, it is desired to reduce the THD value in frequently used temperatures of around 25° C.

Note that effects of the main composition and additives in Mn—Zn based ferrite materials are reported in various ways so far but there has been no report on a technique of reducing the THD in a broad frequency band and/or a wide temperature range.

For example, a technique described in the Japanese Unexamined Patent Application No. 4-336401 Publication is only for attaining high magnetic permeability in a high frequency range by limiting a main composition range and adding additives ($SiO_2$, CaO, $Nb_2O_5$ and $Bi_2O_3$) by suitable amounts. Also, a technique described in the Japanese Unexamined Patent Application No. 10-50512 Publication is only for attaining high magnetic permeability in a high frequency range by limiting a main composition range, adding additives ($SiO_2$, CaO, $Nb_2O_5$ and $Bi_2O_3$) by suitable amounts, limiting a range of an absolute value of a complex initial permeability in a broad frequency range and limiting a range of a value of DC resistivity. Furthermore, a technique described in the Japanese Unexamined Patent Application No. 6-151151 Publication is only for attaining high magnetic permeability in a high frequency range by limiting a main composition range and adding additives ($SiO_2$, CaO, $Sb_2O_2$, $Nb_2O_5$ and $Ta_2O_5$) by suitable amounts. Also, a technique described in the Japanese Unexamined Patent Application No. 9-326310 Publication is only for attaining low losses by limiting a main composition range and adding additives ($SiO_2$, $TiO_2$, CaO, $Nb_2O_5$ and $Ta_2O_5$) by suitable amounts.

Note that a technique described in the Japanese Unexamined Patent Application No. 6-290926 Publication specifies a composition difference of ZnO between a surface and inside of a sintered core in low-temperature sintering in order to provide a low-loss magnetic material. In the technique described in the Publication, however, it is required that all of $SiO_2$, CaO, $TiO_2$, $Nb_2O_5$ and $V_2O_5$ are included as additives. However, according to experiments by the present inventors, it was proved that when $V_2O_5$ is added as an additives in a composition of the present invention, a microstructure becomes nonuniform and the THD deteriorates adversely.

Also, there described in the Japanese Unexamined Patent Application No. 4-336401 Publication and in the Japanese Unexamined Patent Application No. 10-50512 Publication that it is effective for improving magnetic permeability in a high frequency range by adding $Bi_2O_3$. However, according to experiments by the present inventors, it is proved that when $Bi_2O_3$ is added as an additive to a composition of the present invention, growth of crystal grain is accelerated, while a microstructure becomes nonuniform and the THD deteriorates adversely.

Note that there were some examples in the past that temperature dependency of a magnetic anisotropy constant K1 became less by adding CoO to an Mn—Zn based ferrite (the Japanese Unexamined Patent Application No. 6-290925, the Japanese Unexamined Patent Application No. 8-191011, the Japanese Examined Patent Application No. 52-4753, the Japanese Examined Patent Application No. 4-33755 and the Japanese Examined Patent Application No. 8-1844 Publications). However, there is no technical idea disclosed of reducing temperature dependency of the THD characteristics of a transformer and reducing the THD of a transformer in a wide temperature range for a magnetic core for transformer of a modem used in high speed data communication of the xDSL by adding CoO.

Namely, all of the Japanese Unexamined Patent Application No. 9-290925, the Japanese Examined Patent Application No. 8-1844 and the Japanese Unexamined Patent Application No. 8-191011 Publications relate to transformers for power sources and objects and use thereof are totally different from those of magnetic cores for transformers of modems. Note that the Japanese Examined Patent Application No. 52-4753 Publication discloses a technique of making a temperature coefficient of magnetic permeability smaller and does not relates to a magnetic core for a transformer of xDSL modems. Since a transmission speed is extremely high in the xDSL, the inductance may be small for increasing the impedance, so the magnetic permeability may be small. Thus, the above Publications disclosing inventions relating to magnetic permeability do not disclose a technique for reducing the temperature dependency of the THD characteristics of a transformer. Also, an invention described in the Japanese Examined Patent Application No. 4-33755 Publication relates to a power source transformer and an inductance element and does not disclose a technique for reducing temperature dependency of the THD characteristics of a transformer.

SUMMERY OF THE INVENTION

The present invention has been made in consideration with the above circumstances and has as an object thereof to provide a magnetic core of a transformer preferably used in a modem of xDSL and other high speed data communications with a superior THD characteristics in a broad frequency band and/or wide temperature range and a composition thereof.

To attain the above object, according to a first aspect of the present invention, there is provided an Mn—Zn based ferrite composition having a main component comprised of $Fe_2O_3$: 51.5 to 54.5 mol % and ZnO: 19.0 to 27.0 mol % and the rest of substantially MnO, and a first sub component comprised of 0.002 to 0.040 wt % of $SiO_2$, 0.003 to 0.045 wt % of CaO and 0.010 wt % or less of P with respect to 100 wt % of said main component.

By producing a magnetic core of a transformer with the Mn—Zn based ferrite composition according to the first aspect of the present invention, the THD characteristics of the transformer becomes as small as −84 dB or less in a broad frequency band. As a result, distortion of transmission waveforms and noise become small in the xDSL and other high speed data communications, an occurrence of transmission errors can be prevented, and a data signal can be transmitted at high precision.

Note that the THD is defined by the above formula (1).

In the first aspect of the present invention, there is a tendency that when $Fe_2O_3$ in the main component composition of the Mn—Zn based ferrite composition becomes less than 51.5 mol %, not only deteriorates the THD but the Curie point falls to an actual use temperature range and properties as ferrite are liable to be lost. While, when $Fe_2O_3$ becomes more than 54.5 mol % or ZnO becomes less than 19.0 mol %, the THD is liable to be deteriorated. Also, when ZnO becomes more than 27.0 mol %, the Curie point falls to the actual use temperature range and properties of ferrite are liable to be lost.

In the first aspect of the present invention, when $SiO_2$ becomes out of a range of 0.002 to 0.040 wt %, CaO becomes out of a range of 0.003 to 0.045 wt % or P becomes more than 0.010 wt % in the first sub component, the THD is liable to deteriorate due to abnormal growth of crystal.

According to a second aspect of the present invention, there is provided an Mn—Zn based ferrite composition, having a main component comprised of $Fe_2O_3$: 51.5 to 54.5 mol % and ZnO: 19.0 to 27.0 mol % and the rest of substantially MnO, and a first sub component comprised of 0.002 to 0.040 wt % of $SiO_2$, 0.003 to 0.045 wt % of CaO and 0.010 wt % or less of P with respect to 100 wt % of said main component, and a second sub component comprised of at least one selected from 0.050 wt % or less (excluding 0) of $Nb_2O_5$, 0.100 wt % or less (excluding 0) of $Ta_2O_5$, 0.500 wt % or less (excluding 0) of $SnO_2$, 0.500 wt % or less (excluding 0) of $TiO_2$, 0.500 wt % or less (excluding 0) of $In_2O_3$ and 0.150 wt % or less (excluding 0) of $Sb_2O_3$ with respect to 100 wt % of said main component.

By producing a magnetic core of a transformer with the Mn—Zn based ferrite composition according to the second aspect of the present invention, the THD characteristics of the transformer become as small as −85 dB or less in a broad frequency band. As a result, distortion of transmission waveforms and noise become small in the xDSL and other high speed data communications, an occurrence of transmission errors can be prevented, and a data signal can be transmitted at high precision.

In the second aspect of the present invention, the main component composition and the first sub component are the same as those in the first aspect of the present invention, and the THD characteristics can be furthermore improved by further containing a second sub component.

Note that when $Nb_2O_5$ becomes more than 0.050 wt %, $Ta_2O_5$ becomes more than 0.100 wt %, $SnO_2$ becomes more than 0.500 wt %, $TiO_2$ becomes more than 0.500 wt %, $In_2O_3$ becomes more than 0.500 wt % or $Sb_2O_3$ becomes more than 0.150 wt % in the second sub component, the THD is liable to deteriorate.

In the first and second aspects of the present invention, preferably, the sintered density of the ferrite core is 4.90 g/cm$^3$ or more, an average crystal grain diameter is 7 $\mu$m to 40 $\mu$m and a composition difference of ZnO between the surface of the sintered core and inside of the sintered core is 1.0 mol % or less.

When the sintered density becomes less than 4.90 g/cm$^3$, the average diameter of crystal grains becomes out of a range of 7 $\mu$m to 40 $\mu$m, or the composition difference of ZnO between the surface and inside of the sintered core becomes more than 1.0 mol %, the THD is liable to be deteriorated.

Preferably, the first and second aspects of the present invention further have a third sub component comprised of 0.02 to 0.50 wt %, more preferably 0.05 to 0.50 wt %, of Co oxide in CoO conversion with respect to 100 wt % of the main component.

In the first and second aspects of the present invention, the temperature dependency of the THD of a transformer can be made smaller by further containing the third sub component including a Co oxide. Particularly, it becomes possible to reduce the THD (preferably to −84 dB or less) at a normal temperature of around 25° C. and reduce the THD of a transformer (preferably to −77 dB or less, more preferably −80 dB or less) stably in a wide temperature range (for example, −40° C. to +85° C.).

According to a third aspect of the present invention, there is provided an Mn—Zn based ferrite composition, having a main component comprised of MnO: 22.0 to 39.0 mol % and ZnO: 7.5 to 25.0 mol % and the rest of substantially $Fe_2O_3$, and a sub component having 0.02 to 0.50 wt % of Co oxide, preferably 0.05 to 0.50 wt % of Co oxide in CoO conversion with respect to 100 wt % of said main component.

By producing a magnetic core of a transformer with the Mn—Zn based ferrite composition according to the third aspect of the present invention, the temperature dependency of the THD characteristics of the transformer can be made small. Particularly, it becomes possible to reduce the THD (preferably to −84 dB or less) at a normal temperature of around 25° C. and reduce the THD of a transformer (preferably to −77 dB or less, more preferably −80 dB or less) stably in a wide temperature range (for example, −40° C. to +85° C.)). As a result, distortion of transmission waveforms and noise become small in an environmental temperature where xDSL modems are used, an occurrence of transmission errors can be prevented, and a data signal can be transmitted at high precision.

In the third aspect of the present invention, the reason, why the temperature dependency of the THD characteristics of a transformer can be made small, can be explained for example as below. Namely, the reason why magnetic losses in an AC magnetic field can be made smaller in a wide temperature range by containing a suitable amount of Co in the Mn—Zn based ferrite composition is considered to be caused by the reason below.

One factor of controlling magnetic losses is magnetic anisotropy constant K1. The magnetic losses changes in accordance with temperature changes of the magnetic anisotropy constant K1 and takes the minimum value at a temperature where K1=0. In order to make the magnetic losses small in a wide temperature range, temperature dependency of the magnetic anisotropy constant K1 has to be small.

The constant differs in accordance with elements constituting a spinel compound which is a main phase of a ferrite. In the case of Mn—Zn based ferrite, the temperature dependency of the magnetic anisotropy constant K1 can be made small and an absolute value of a magnetic-loss temperature coefficient can be made small by introducing Co ion. Namely, the K1 has a negative value in Mn—Zn based ferrite having a composition where $Fe_2O_3$ is around 50 mol %, so a temperature range where K1=0 in the Mn—Zn based ferrite can be made wide by containing therein a suitable amount of Co ferrite having a positive K1 value.

In the third aspect of the present invention, there is a tendency that the THD becomes hard to be reduced in a wide temperature range when a Co oxide is less than 0.02 wt % in CoO conversion, while the THD is liable to be deteriorated at a normal temperature of around 25° C. when exceeding 0.50 wt %. Therefore, the above range is preferable.

Note that in the third aspect of the present invention, when MnO in the main component composition becomes more than 39.0 mol % or ZnO becomes less than 7.5 mol %, losses in the AC magnetic field becomes large and the THD is liable to be increased.

Also, when MnO becomes less than 22.0 mol % or ZnO becomes more than 25.0 mol %, the Curie point declines to the actual use temperature range and the properties as ferrite are liable to be lost.

In the third aspect of the present invention, preferably, the main component is comprised of MnO: 22.0 to 34.5 mol % and ZnO: 12.0 to 25.0 mol % and the rest of substantially $Fe_2O_3$.

In the third aspect of the present invention, preferably, the main component is comprised of MnO: 23 to 33 mol % and ZnO: 13 to 24 mol % and the rest of substantially $Fe_2O_3$.

In the third aspect of the present invention, preferably, the main component is comprised of MnO: 23.8 to 24.2 mol % and ZnO: 23.0 to 23.4 mol % and $Fe_2O_3$: 52.6 to 53.0 mol %.

In this composition range, the THD characteristics of a transformer can be −85 dB or less in a broad frequency band. Therefore, distortion of transmission waveforms and noise in high speed data communications can be made still smaller, an occurrence of transmission errors can be prevented, and a data signal can be transmitted at high precision.

In the third aspect of the present invention, preferably, the main component is comprised of MnO: 26.1 to 26.5 mol % and ZnO: 20.1 to 20.5 mol % and $Fe_2O_3$: 53.2 to 53.6 mol %.

In this composition range, the THD characteristics of a transformer can be −85 dB or less in a broad frequency band. Therefore, distortion of transmission waveforms and noise in high speed data communications can be made still smaller, an occurrence of transmission errors can be prevented, and a data signal can be transmitted at high precision.

In the third aspect of the present invention, preferably, the main component is comprised of MnO: 23.0 to 23.4 mol % and ZnO: 23.4 to 23.8 mol % and $Fe_2O_3$: 53.0 to 53.4 mol %.

In this composition range, the THD characteristics of a transformer can be −80 dB or less in a wide temperature range of −40 to +85° C. and also in a broad frequency band. Therefore, distortion of transmission waveforms and noise in high speed data communications, such as the xDSL, can be made smaller, an occurrence of transmission errors can be prevented, and a data signal can be transmitted at high precision, even if it is used in an environment of a temperature changing widely.

The above Mn—Zn based ferrite composition according to the present invention is preferably used as a magnetic core for transformers, particularly as a magnetic core of a transformer of xDSL modems.

A method of producing an Mn—Zn based ferrite composition or a magnetic core for a transformer includes the step of sintering the ferrite composition or the magnetic core for a transformer at a sintering holding temperature of 1240 to 1340° C. in a sintering process.

In the production method of the present invention, the average diameter of crystal grains of the obtained sintered core tends to become less than 7 $\mu$m, the sintered density tends to be less than 4.90 $g/cm^3$, and the THD tends to deteriorates when the sintering hold temperature is less than 1240° C. While, when the sintering hold temperature exceeds 1340°, the composition difference of ZnO between the surface and inside of the sintered core tends to be more than 1.0 mol % and the THD tends to deteriorates.

Note than in the present invention, the holding time of the sintering hold temperature is not particularly limited, but is preferably 3 hours to 10 hours minutes.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

First Embodiment

Figure 1A:
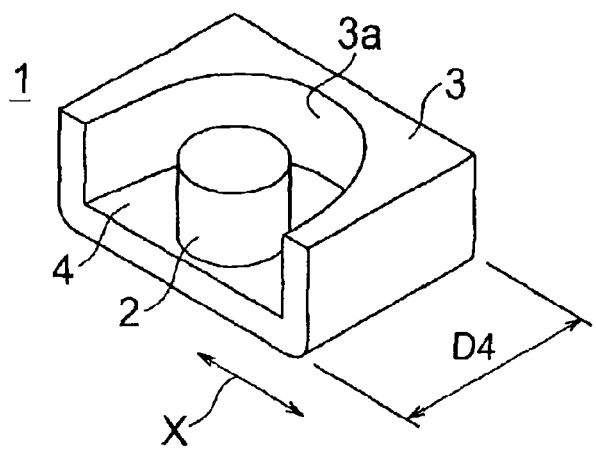
FIG. 1A is a perspective view of a magnetic core which is measured for THD.
Figure 1B:
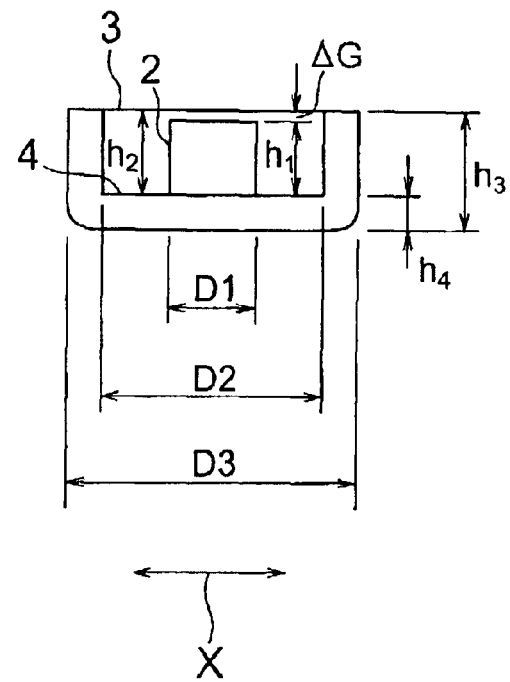
FIG. 1B is a front view of the magnetic core shown in FIG. 1A.

As shown in FIG. 1A and FIG. 1B, the magnetic core 1 for an xDSL modem transformer according to a first embodiment of the present invention is a magnetic core of a so-called "EP shape". It has a center leg 2, an outer leg 3, and a bottom plate 4. These are formed integrally. The center leg 2 rises from the approximate center of the bottom plate 4 in the X-direction (first direction) and has a cylindrical shape. The outer leg 3 rises from the bottom plate 4 so as to surround at least the two sides of the center leg 2 in the X-direction separated by a predetermined space. In the present embodiment, an arc-shaped recessed inner wall 3a substantially concentric with the center leg 2 is formed at the outer leg 3.

Usually two magnetic cores 1 are used. They are used with one magnetic core 1 superposed on the other magnetic core 1 turned around and with the center legs 2 and outer legs 3 superposed respectively. At this time, the center legs 2 are inserted into bobbins around which the primary coil and secondary coil are wound. To adjust the inductance to a suitable value, a gap $\Delta G$ is provided at the tops of the center legs 2 of the magnetic core 1.

That is, when a gap $\Delta G$ is necessary, at least one magnetic core 1 has a relationship of $h_2=h_1+\Delta G$ of a height $h_1$ from the bottom plate 4 of the center leg 2 and the height $h_2$ from the bottom plate 4 of the outer leg 3. When two magnetic cores 1 are used superposed, there is at least a gap $\Delta G$.

Note that in the present embodiment, an outer diameter D1 of the center leg 2 is about 2 to 5 mm, an inner diameter D2 of the outer leg 3 is about 6 to 9 mm, a sideway width D3 in the X direction of the outer leg 3 is about 7 to 11 mm, a lengthwise width D4 is about 5 to 8 mm, a height h3 of the outer leg 3 is about 2 to 5 mm, and a thickness h4 of the bottom plate 4 is about 0.5 to 2 mm.

In order to reduce the leakage inductance, the primary coil was divided into two to form a sandwich coil of, for example, a primary coil (70 turns)—secondary coil (140 turns)—primary coil (70 turns).

The magnetic core 1 for an xDSL modem transformer of the present embodiment shown in FIG. 1A and FIG. 1B is produced for example as shown below.

As the starting materials of the main component, $Fe_2O_3$, $Mn_3O_4$, and ZnO are used. Further, as the starting materials of sub components, CoO, $SiO_2$, CaO, $CaCO_3$, $Nb_2O_5$, $Ta_2O_5$, $TiO_2$, $In_2O_3$, $Sb_2O_3$, $V_2O_5$, $MoO_3$, ZrO, $Bi_2O_3$, $SnO_2$, and P, etc. are used.

In the present invention, the starting materials are weighed so that the composition of the main component after sintering has predetermined mol %. These are wet mixed, then dried and calcined in the atmosphere for 2 hours at 900° C.

Next, the sub components are added to the obtained calcined material and mixed ball milling. After mixing, a suitable binder, for example, polyvinyl alcohol, is added, the result is granulated by a spray drier etc., then the EP shape is formed. The obtained shaped article is sintered at 1220 to 1400° C., preferably 1240 to 1340° C. in an atmosphere controlled in oxygen concentration to obtain the magnetic core 1 for a transformer comprised of an Mn—Zn-based ferrite sintered core as shown in FIG. 1A and FIG. 1B.

Second Embodiment

Figure 5A:
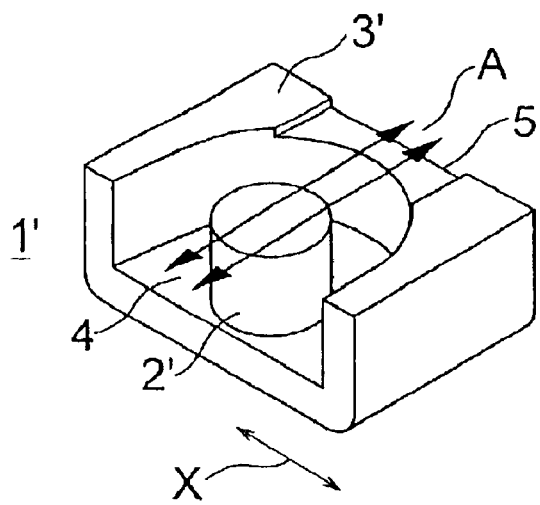
FIG. 5A is a perspective view of a modification example of the magnetic core shown in FIG. 1A and FIG. 1B.
Figure 5B:
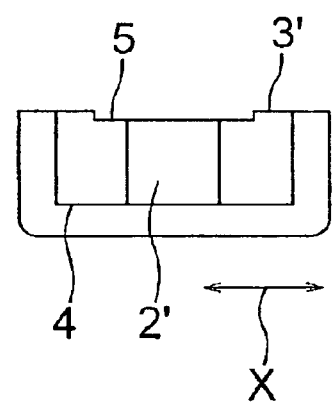
FIG. 5B is a front view of the magnetic core shown in FIG. 5A.

As shown in FIG. 5A and FIG. 5B, the magnetic core 1' for a transformer according to the second embodiment of the present invention is a modification of the magnetic core 1 for a transformer according to the first embodiment and is the same in the composition. In the magnetic core 1' for a transformer, a through gap 5 of substantially the same height as the height of the center leg 2' is formed at part of the top of the outer leg 3'. The width of the through gap 5 is made larger than the outside diameter of the center leg 3'.

This through gap 5 is formed by making a grinding pad of a grinding apparatus move horizontally to the outer leg 3' as shown by the arrow A of FIG. 5A when grinding the top of the center leg 2' by the grinding apparatus to form a gap $\Delta G$ shown in FIG. 1B.

In the magnetic core 1' for a transformer of the present embodiment, since the height of the center leg 2' of the magnetic core 1' and the height of the through gap 5 of the outer leg 3' are made the same, it is possible to simultaneously grind the center leg 2' and the through gap 5 of the outer leg 3' by the same grinding step. That is, by aligning a plurality of magnetic core materials in the arrow direction A and grinding while moving the grinding pad from the center legs 2' to the outer legs 3' as shown by the arrow A, it becomes possible to simultaneously process a large number of magnetic cores by a single grinding step and therefore process the gaps of the magnetic cores with a good mass productivity.

Note that even if providing the through gap 5 at the part of the outer leg 3' in this way, in the magnetic core 1' for a transformer made from the transformer magnetic core composition of the present invention, the THD of the transformer in the broad frequency band only becomes higher only by about 2 dB compared with the magnetic core 1 of the center gap shown in FIG. 1A and FIG. 1B.

This through gap can be applied not only to an EP shape, but also a later mentioned RM shape, pot shape, EPC shape, etc.

Third Embodiment

Figure 6A:
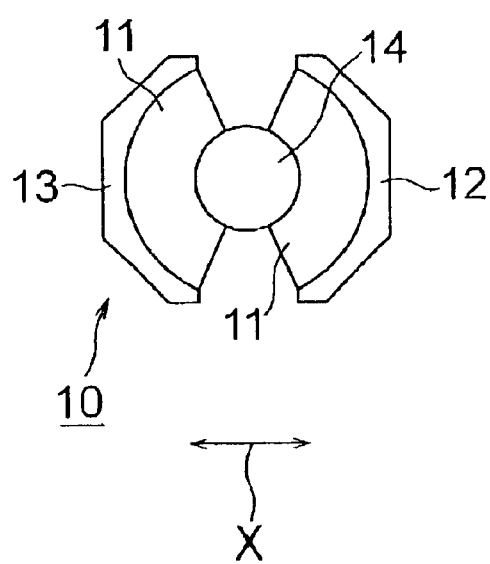
FIG. 6A is a plan view of a magnetic core of an RM shape.
Figure 6B:
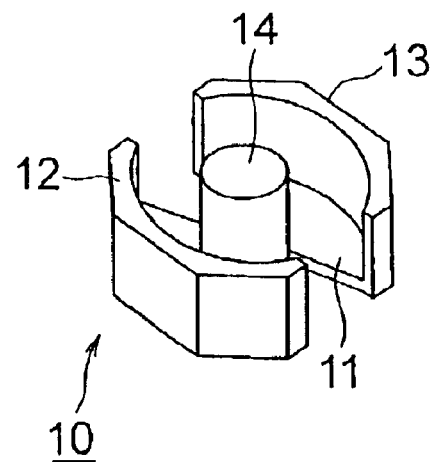
FIG. 6B is a perspective view of the magnetic core shown in FIG. 6A.

As shown in FIG. 6A and FIG. 6B, the magnetic core for a transformer according to the third embodiment of the present invention is the same in the composition as the magnetic core 1 for a transformer according to the first embodiment and differs only in the shape.

As shown in FIG. 6A and FIG. 6B, the magnetic core 10 is a magnetic core of a so-called "RM shape" and is provided with a disk (bottom plate) 11, a ring (outer leg) 12 and 13 formed integrally with the peripheral edges, and a slug (center leg) 14 formed at the center of the disk 11.

Fourth Embodiment

Figure 7A:
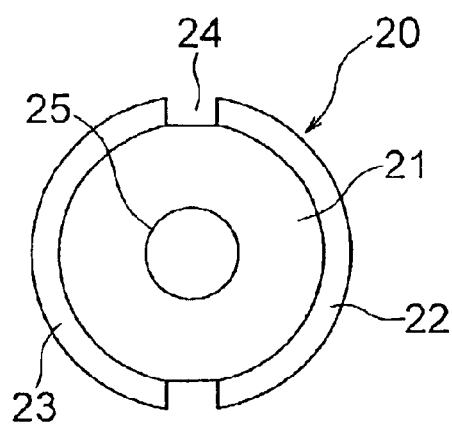
FIG. 7A is a plan view of a magnetic core of a pot shape.
Figure 7B:
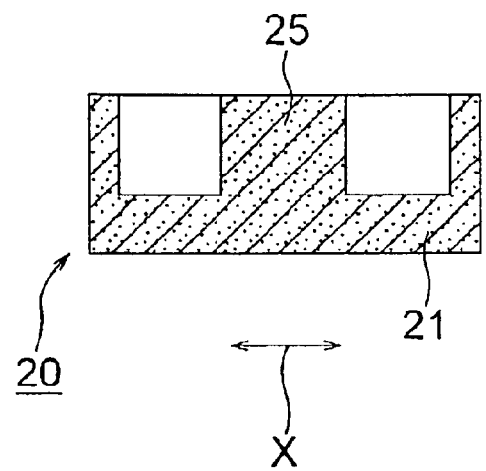
FIG. 7B is a sectional view of the magnetic core shown in FIG. 7A.

As shown in FIG. 7A and FIG. 7B, the magnetic core for a transformer according to the fourth embodiment of the present invention is the same in the composition as the magnetic core 1 for a transformer according to the first embodiment and differs only in the shape.

As shown in FIG. 7A and FIG. 7B, the magnetic core 20 is a magnetic core of a so-called "pot shape" and is provided with a ring (outer leg) 22 and 23 formed integrally with the peripheral edges of a disk (bottom plate), cutaway parts 24, and a slug (center leg) 25 formed integrally at the peripheral edges of the disk 21.

Fifth Embodiment

Figure 8:
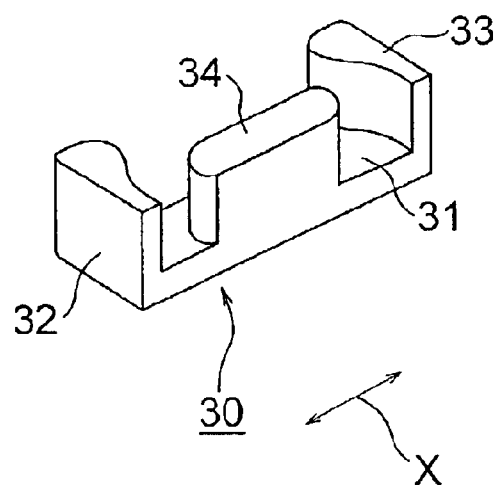
FIG. 8 is a perspective view of a magnetic core of an EPC shape.

As shown in FIG. 8, the magnetic core 30 for a transformer according to the fifth embodiment of the present invention is the same in the composition as the magnetic core 1 for a transformer according to the first embodiment and differs only in the shape.

As shown in FIG. 8, the magnetic core 30 is a magnetic core of a so-called "EPC shape", is integrally formed with a center leg 34 at the center in the X-direction of the bottom plate, and is integrally formed with outer legs 32 and 33 at the two sides.

Other Embodiments

Note that the present invention is not limited to the above embodiments and may be modified in various ways within the scope of the present invention.

For example, the shape of the magnetic core for a transformer is not limited to the above shape. It may also be an EE shape comprised of a combination of a pair of E-shaped magnetic cores, an EI shape comprised of a combination of an E-shaped magnetic core and I-shaped magnetic core, or other shape. Whatever the shape, it is possible to make the THD of the transformer reduced in a broad frequency band.

Next, the present invention will be explained in further detail based on examples, but the present invention is not limited to these examples.

SAMPLES NO. 1 TO NO. 9 (EXAMPLES) AND SAMPLES NO. 10 TO NO. 18 (COMPARATIVE EXAMPLES)

As the starting materials of the main component, $Fe_2O_3$, $Mn_3O_4$, and ZnO were used. Further, as the sub components, $SiO_2$, CaO and P were used.

The starting materials were weighed so that the composition of main components became as shown in Table 1 after sintering. They were wet mixed, dried, then calcined in the atmosphere for 2 hours at 900° C.

$SiO_2$, CaO and P as the sub components were added to the obtained calcined material so that the composition after sintering becomes 0.010 wt % of $SiO_2$, 0.010 wt % of CaO and 0.0006 wt % of P with respect to 100 wt % of the main components. They were mixed by ball milling. After mixing, a binder, that is, polyvinyl alcohol, was added, the result was granulated by a spray drier etc., then the EP shape shown in FIG. 1A and FIG. 1B was formed. The obtained shaped article was sintered at 1220 to 1370° C. in an atmosphere controlled in oxygen concentration to obtain Mn—Zn-based ferrite cores.

Next, each of these Mn—Zn-based ferrite sintered cores were used as magnetic cores for a transformer and measured for THD.

The evaluation conditions will be explained next. As the magnetic core, the magnetic core 1 of an EP shape as shown in FIG. 1A and FIG. 1B was used.

Two magnetic coils 1 were used. These were used in a state with the center leg 2 and the outer leg 3 overlaid respectively. At that time, the center leg 2 was inserted into bobbins around which the primary coil and secondary coil were wound. A gap $\Delta G$ was provided at the center leg of the magnetic core in accordance with need to adjust the inductance to a suitable value. Note that in FIG. 1A and FIG. 1B, h3=3.7 mm, h4=1.1 mm, D1=3.3 mm, D2=7.4 mm, D3=9.2 mm, and D4=6.35 mm.

To reduce the leakage inductance, the primary coil was divided into two to form a sandwich coil of a primary coil (70 turns)—secondary coil (140 turns)—primary coil (70 turns). This transformer was connected to an audio analyzer for measurement of the THD.

Figure 2:
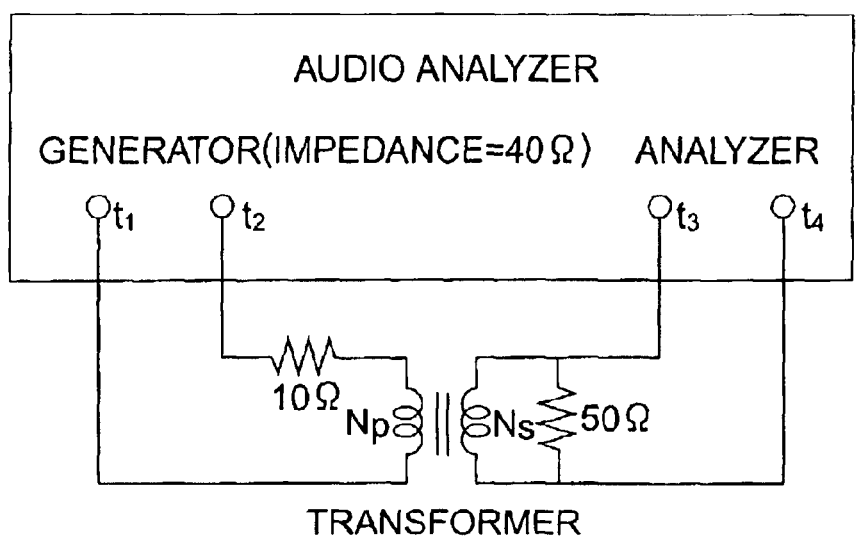
FIG. 2 is a circuit diagram of THD measurement.

As an audio analyzer, a System 2 made by Audio Precision Co. was used. As shown in FIG. 2, the primary coil Np of the transformer was connected in series to a 10 Ω resistance and connected to the terminals $t_1$ and $t_2$. The secondary coil Ns was connected in parallel to a 50 Ω resistance and connected to the terminals $t_3$ and $t_4$ Note that since a 40 Ω resistance was connected in series to the generator side of the measuring instrument, a 50 Ω resistance was connected in series at the primary side of the transformer.

A data signal having a frequency of 5 kHz was input to the primary coil Np of the transformer from the terminals $t_1$ and $t_2$ to give a voltage across the ends of the primary side of the transformer of 1.8V, while the transmission waveform output to the secondary coil Ns side was input to the terminals $t_3$ and $t_4$. The results were analyzed by the analyzer and the THD at 25° C. was measured. The results of the measurement are shown in Table 1.

Figure 3:
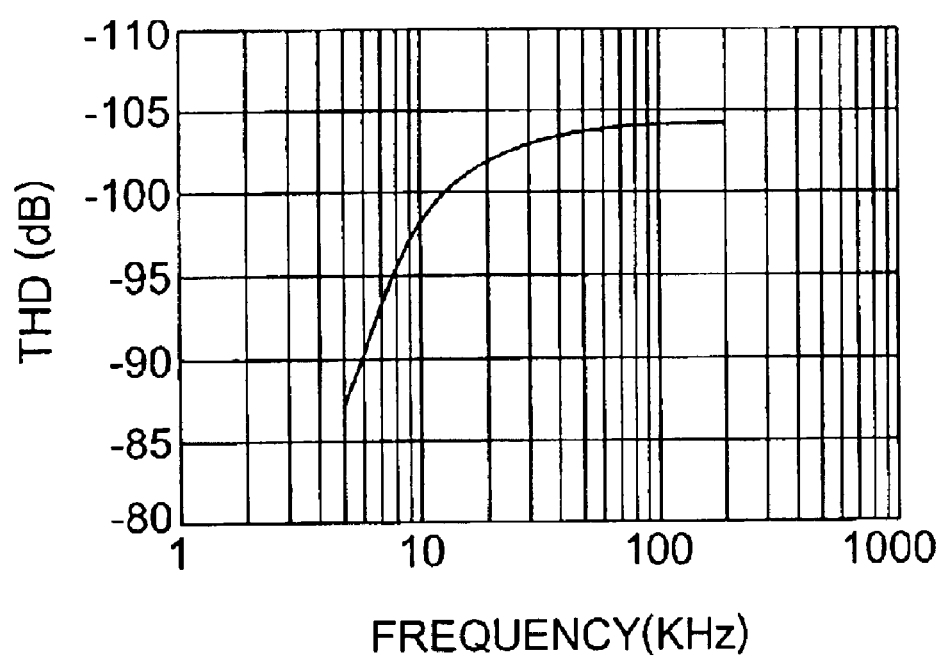
FIG. 3 is a graph of the broad frequency band characteristic of THD in an embodiment of the present invention.

Note that the reason why the frequency was set to 5 kHz in measuring the THD was because, as shown in FIG. 3, the THD at a high frequency is smaller in value and therefore more superior than the THD at a low frequency, so for example by measuring the value at 5 kHz, it is possible to judge the characteristic of a broad frequency band above that, and more precise evaluation can be made on the magnetic materials. Namely, the lower the frequency, the easier to determine the superiority of magnetic cores in the THD characteristics of the transformer.

Table 1 shows main compositions in the Samples No. 1 to No. 18 and THD characteristics thereof. As shown in Table 1, the Samples No. 1 to No. 18 are examples and the Samples No. 10 to No. 18 are comparative examples.

TABLE 1

| No. | $Fe_2O_3$ (mol %) | MnO (mol %) | ZnO (mol %) | THD (dB) | Note |
|---|---|---|---|---|---|
| 1 | 52.9 | 23.9 | 23.2 | −86 | Example |
| 2 | 53.3 | 25.5 | 21.2 | −85 | |
| 3 | 52.5 | 22.3 | 25.2 | −86 | |
| 4 | 53.6 | 26.9 | 19.5 | −85 | |
| 5 | 52.4 | 21.1 | 26.5 | −86 | |
| 6 | 52.0 | 22.0 | 26.0 | −85 | |
| 7 | 54.0 | 26.6 | 19.4 | −85 | |
| 8 | 52.7 | 20.3 | 27.0 | −85 | |
| 9 | 53.2 | 23.2 | 23.6 | −84 | |
| 10 | 53.8 | 36.2 | 10.0 | −72 | Comparative Example |
| 11 | 54.7 | 35.3 | 10.0 | −75 | |
| 12 | 53.9 | 32.1 | 14.0 | −77 | |
| 13 | 54.7 | 31.3 | 14.0 | −79 | |
| 14 | 53.1 | 28.4 | 18.5 | −81 | |
| 15 | 53.8 | 27.7 | 18.5 | −83 | |
| 16 | 55.0 | 35.8 | 9.2 | −74 | |
| 17 | 55.0 | 32.2 | 12.8 | −78 | |
| 18 | 51.2 | 22.0 | 26.8 | −77 | |

As shown in Table 1, the following becomes clear from a comparison of examples of Samples No. 1 to No. 9 and comparative examples of the Samples No. 10 to No. 18. That is, in the case of a magnetic core comprised of an Mn—Zn-based ferrite material having a main component containing $Fe_2O_3$: 51.5 to 54.5 mol % and ZnO: 19.0 to 27.0 mol %, and the rest of substantially MnO, it became clear that the THD of the transformer became a small value of not more than −84 dB in a broad frequency band under conditions of 25° C. and 5 kHz.

Note that the main component composition of the Sample No. 9 exhibits, as shown in Table 1, the THD of −84 dB at 25° C., and while not shown in Table 1, exhibits the minimum value of −86 dB at around 10° C., furthermore, a small value of −84 dB even at −40° C. Accordingly, the magnetic core of a transformer of the Sample No. 9 can be also preferably used in a temperature environment lower than the room temperature.

On the other hand, as in the Samples No. 10 to No. 18, in the case of a magnetic core comprised of an Mn—Zn-based ferrite material having a main component containing $Fe_2O_3$: out of 51.5 to 54.5 mol % or ZnO: out of 19.0 to 27.0 mol %, and the rest of substantially MnO, the THD of the transformer becomes as large as −83 dB or more under conditions of 25° C. and 5 kHz in all cases, and there observed a tendency that the THD became deteriorated as a composition of ZnO decreased. Due to the above, it is considered that the main component composition of around where the crystal magnetic anisotropy constant and the magnetic distortion constant become small is effective to make the THD small.

SAMPLES NO. 21 TO 40 (EXAMPLES) AND SAMPLES NO. 41 TO 47 (COMPARATIVE EXAMPLE)

Except for fixing $Fe_2O_3$ to 52.9 mol %, MnO to 23.9 mol % and ZnO to 23.2 mol % as in the Sample No. 1 in Table 1 and adding as first sub components $SiO_2$, CaO and P so that the composition after sintering becomes as shown in Table 2, the magnetic core for a transformer was formed and tested in the same way as in the Sample No. 1. The results are shown in Table 2.

TABLE 2

| No. | $SiO_2$ (wt %) | CaO (wt %) | P (wt %) | THD (dB) | Note |
|---|---|---|---|---|---|
| 21 | 0.002 | 0.003 | 0.0006 | −84 | Example |
| 22 | 0.002 | 0.010 | 0.0006 | −86 | |
| 23 | 0.002 | 0.030 | 0.0006 | −86 | |
| 24 | 0.002 | 0.045 | 0.0006 | −85 | |
| 25 | 0.010 | 0.003 | 0.0006 | −86 | |
| 26 | 0.010 | 0.010 | 0.0006 | −86 | |
| 27 | 0.010 | 0.030 | 0.0006 | −86 | |
| 28 | 0.010 | 0.045 | 0.0006 | −85 | |
| 29 | 0.020 | 0.003 | 0.0006 | −86 | |
| 30 | 0.020 | 0.010 | 0.0006 | −85 | |
| 31 | 0.020 | 0.030 | 0.0006 | −86 | |
| 32 | 0.020 | 0.045 | 0.0006 | −85 | |
| 33 | 0.040 | 0.003 | 0.0006 | −86 | |
| 34 | 0.040 | 0.010 | 0.0006 | −86 | |
| 35 | 0.040 | 0.030 | 0.0006 | −85 | |
| 36 | 0.040 | 0.045 | 0.0006 | −84 | |
| 37 | 0.010 | 0.010 | 0.0006 | −86 | |
| 38 | 0.010 | 0.010 | 0.0020 | −86 | |
| 39 | 0.010 | 0.010 | 0.0050 | −85 | |
| 40 | 0.010 | 0.010 | 0.0100 | −84 | |
| 41 | 0.010 | 0.050 | 0.0006 | −83 | Comparative Example |
| 42 | 0.010 | 0.070 | 0.0006 | −82 | |
| 43 | 0.010 | 0.100 | 0.0006 | −80 | |
| 44 | 0.045 | 0.010 | 0.0006 | −83 | |
| 45 | 0.050 | 0.010 | 0.0006 | −82 | |
| 46 | 0.010 | 0.010 | 0.0120 | −82 | |
| 47 | 0.010 | 0.010 | 0.0150 | −81 | |

In Table 2, the Samples No. 21 to No. 40 are examples and the Samples No. 41 to No. 47 are comparative examples. As shown in Table 2, in a range where $SiO_2$ became 0.002 to 0.040 wt %, CaO became 0.003 to 0.045 wt % and P became 0.010 wt % or less with respect to 100 wt % of the main component composition, the THD exhibited a small value of −84 dB or less in all cases. However, as shown in the comparative examples of Samples No. 41 to No. 47 in Table 2, it was confirmed that when being out of the above range, the THD became large as −83 dB or more in all cases. Also, it was confirmed that when $SiO_2$, CaO and/or P were added exceeding the above ranges, abnormal grain growth of crystal started and the THD furthermore deteriorated. Namely, it is considered that since $SiO_2$ and CaO have an effect of accelerating sintering, it shows an effect of making the THD small by being added by a suitable amount, while when excessively added, it starts abnormal grain growth and deteriorates the THD.

SAMPLES NO. 50 TO NO. 56 (EXAMPLES) AND SAMPLES NO. 57 TO NO. 60 (COMPARATIVE EXAMPLES)

Except for fixing $Fe_2O_3$ to 52.9 mol %, MnO to 23.9 mol % and ZnO to 23.2 mol % as in the Sample No. 1 in Table 1, changing the adding ratio of $SiO_2$, CaO and P as first sub components, and changing the sintering conditions to obtain sintered cores of a variety of sintered densities as shown in Table 3, the magnetic cores for a transformer were formed and tested in the same way as in the Sample No. 1. The results are shown in Table 3. Note that measurement of the sintered density was carried out based on the Archimedes' method.

TABLE 3

| No. | Sintered Density (g/cm³) | THD (dB) | Note |
| --- | --- | --- | --- |
| 50 | 5.07 | −86 | Example |
| 51 | 5.03 | −86 | |
| 52 | 5.00 | −86 | |
| 53 | 4.97 | −85 | |
| 54 | 4.95 | −85 | |
| 55 | 4.92 | −85 | |
| 56 | 4.90 | −84 | |
| 57 | 4.87 | −83 | Comparative |
| 58 | 4.83 | −82 | Example |
| 59 | 4.80 | −82 | |
| 60 | 4.70 | −81 | |

In Table 3, the Samples No. 50 to No. 56 are examples and the Samples No. 57 to No. 60 are comparative examples. As shown in Table 3, it was confirmed that when the sintered density of a sintered core composing the magnetic core of a transformer was 4.90 g/cm³ or more, the THD exhibited a small value of −84 dB or less, while when the sintered density became less than 4.90 g/cm³, there was a tendency that the THD deteriorated.

SAMPLES NO. 70 TO NO. 77 (EXAMPLES) AND SAMPLES NO. 78 TO NO. 81 (COMPARATIVE EXAMPLES)

Except for fixing $Fe_2O_3$ to 52.9 mol %, MnO to 23.9 mol % and ZnO to 23.2 mol % as in the Sample No. 1 in Table 1, changing the adding ratio of $SiO_2$, CaO and P as first sub components, and changing the sintering conditions to obtain sintered cores of a variety of average grain diameters as shown in Table 4, the magnetic cores for a transformer were formed and tested in the same way as in the Sample No. 1. The results are shown in Table 4.

Note that measurement of an average diameter "G" of the sintered cores was carried out as below. That is, obtained by $G=(\pi/2) \times L$. Note that "L" in the formula indicates a two-dimensional average measurement value of crystal grains and obtained as below. Namely, first, by cutting the sintered core, taking a micrograph of the cut surface of inside the sintered core, taking a measurement region of 320 μm×240 μm, and freely drawing "n" numbers of straight lines crossing the measurement region. Next, the number of crystal grains included in the respective straight lines were counted in the measurement region, and the two dimensional average measurement value "L" of the crystal grain was obtained from the formula $L=(L1/N1+L2/N2+ \ldots Ln/Nn)/n$ by setting the numbers of crystal grains as N1, N2, ..., Nn and lengths of the lines L1, L2, ..., Ln.

TABLE 4

| No. | Average Crystal Grain Diameter (μm) | THD (dB) | Note |
| --- | --- | --- | --- |
| 70 | 7 | −84 | Example |
| 71 | 10 | −85 | |
| 72 | 13 | −86 | |
| 73 | 18 | −86 | |
| 74 | 25 | −86 | |
| 75 | 33 | −85 | |
| 76 | 37 | −84 | |
| 77 | 40 | −84 | |
| 78 | 42 | −83 | Comparative |
| 79 | 47 | −82 | Example |
| 80 | 54 | −81 | |
| 81 | 60 | −79 | |

In Table 4, the Samples No. 70 to No. 77 are examples and the Samples No. 78 to No. 81 are comparative examples. As shown in Table 4, the THD exhibited a small value of −84 dB or less in a range where the average crystal grain diameter composing the magnetic core of a transformer was 7 to 40 μm. While, the THD became −83 dB or more when the value became larger than 40 μm, furthermore, as the crystal grain diameter became larger, uniform grain growth became gradually difficult, so it was observed that the THD was liable to deteriorate.

According to the experiments by the present inventors, it was proved that the sintering holding temperature was preferably held at 1240° C. to 1340° C. to control the average crystal diameter to be 7 to 40 μm, and it was preferable that the content of $SiO_2$ was set to 0.002 to 0.04 wt % and the content of CaO was set to 0.003 to 0.045 wt %. Namely, it was confirmed that there was a tendency that the average crystal grain diameter did not reach 7 μm when the temperature was lower than 1240° C., while exceeded 40 μm when higher than 1340° C. Also, it was confirmed when the content of $SiO_2$ exceeded 0.04 wt % or the content of CaO exceeded 0.045 wt %, the crystal easily ended up in abnormal grain growth and the average crystal grain diameter was liable to exceed 40 μm.

SAMPLES NO. 90 TO NO. 95 (EXAMPLES) AND SAMPLES NO. 96 TO NO. 98 (COMPARATIVE EXAMPLES)

Except for fixing $Fe_2O_3$ to 52.9 mol %, MnO to 23.9 mol % and ZnO to 23.2 mol % as in the Sample No. 1 in Table 1, changing the adding ratio of $SiO_2$, CaO and P as first sub components, and changing the sintering conditions to obtain sintered cores wherein a composition difference of ZnO between the surface and inside was changed as shown in Table 5, the magnetic cores for a transformer were formed and tested in the same way as in the Sample No. 1. The results are shown in Table 5.

TABLE 5

| No. | Composition Difference of ZnO between Surface and Inside (mol %) | THD (dB) | Note |
|---|---|---|---|
| 90 | 0.1 | −86 | Example |
| 91 | 0.2 | −86 | |
| 92 | 0.3 | −86 | |
| 93 | 0.5 | −85 | |
| 94 | 0.7 | −85 | |
| 95 | 1 | −84 | |
| 96 | 1.2 | −82 | Comparative |
| 97 | 1.5 | −81 | Example |
| 98 | 1.8 | −81 | |

Table 5 shows an example of a change of THD characteristics with respect to the composition difference of ZnO between the surface and inside of the sintered core. Note that the inside the sintered core was a part polished for 300 to 500 μm or more from the surface of the sintered core. Analysis of the composition was carried out by using a Shimazu Corporation Multi-Channel X-ray Fluorescence Spectrometer (MZF-2100) on the surface and inside of the sintered cores under conditions of an output of 40 KV and 70 mA.

In Table 5, the Samples No. 90 to No. 95 are examples and the Samples No. 96 to No. 98 are comparative examples. As shown in Table 5, the THD exhibited a small value of −84 dB or less when the composition difference of ZnO on the surface and inside was 1.0 mol % or less. On the other hand, when the THD became more than 1.0 mol %, the THD became −82 dB or more. It is considered that this was caused by an increase of a stress put on inside the sintered core due to evaporation of ZnO near the surface of the sintered core, and the THD was deteriorated.

SAMPLES NO. 101 TO NO. 103 (EXAMPLES) AND SAMPLES NO. 100 AND NO. 104 (COMPARATIVE EXAMPLES)

Except for setting the composition of the first sub components the same as that in the Sample No. 1 in Table 1 and changing only the sintering conditions (1220 to 1370° C. under an atmosphere controlled in oxygen concentration) to obtain sintered cores, the magnetic cores for a transformer were formed and tested in the same way as in the Sample No. 1. The results are shown in Table 6.

TABLE 6

| No: | Sintering Hold Temperature (° C.) | Composition Difference of ZnO between Surface and Inside (mol %) | Sintered Density (g/cm³) | THD (dB) | Note |
|---|---|---|---|---|---|
| 100 | 1220 | 0.1 | 4.87 | −83 | Comparative Example |
| 101 | 1240 | 0.3 | 4.93 | −85 | Example |
| 102 | 1300 | 0.7 | 5.07 | −86 | |
| 103 | 1340 | 1 | 5.07 | −84 | |
| 104 | 1370 | 1.2 | 5.07 | −82 | Comparative Example |

Table 6 shows examples of sintering holding temperatures, composition differences of ZnO on the surface and inside, sintered densities and the THD characteristics in a sintering process of Mn—Zn based ferrite. In Table 6, the Samples No. 101 to No. 103 are examples and the Samples No. 100 and No. 104 are comparative examples. As shown in Table 6, the lower the sintering holding temperature, the better to reduce the composition difference of ZnO on the surface and inside of the ferrite, and the higher the sintering holding temperature, the better to obtain a higher sintered density. When taking the knowledge and the THD values into account, it can be confirmed that the sintering holding temperature was preferably in a range of 1240 to 1340° C.

Namely, it was confirmed that the THD was larger than −84 dB when the temperature was less than 1240° C., while the THD was also larger than −84 dB when the temperature was more than 1340° C. It was confirmed that in this temperature range, the composition difference of ZnO on the surface and inside became 1 mol % or less and the sintered density became 4.90 g/cm³ or more.

SAMPLES NO. 111 TO NO. 151 (EXAMPLES) AND SAMPLES NO. 152 AND NO. 163 (COMPARATIVE EXAMPLES)

Except for setting the main component composition the same as that in the Sample No. 1 in Table 1, 0.010 wt % of $SiO_2$ and 0.010 wt % of CaO are contained as the first sub components and containing at least one selected from $Nb_2O_5$, $Ta_2O_5$, $SnO_2$, $TiO_2$, $In_2O_3$ and $Sb_2O_3$ as second sub components by contents shown in Table 7 and Table 8, the magnetic cores for a transformer were formed and tested in the same way as in the Sample No. 1. The results are shown in Table 7 and Table 8.

TABLE 7

| No. | $SiO_2$ (wt %) | CaO (wt %) | $Nb_2O_5$ (wt %) | $Ta_2O_5$ (wt %) | $SnO_2$ (wt %) | $TiO_2$ (wt %) | $In_2O_3$ (wt %) | $Sb_2O_3$ (wt %) | THD (dB) | Note |
|---|---|---|---|---|---|---|---|---|---|---|
| 111 | 0.01 | 0.01 | 0 | — | — | — | — | — | −86 | Example |
| 112 | 0.01 | 0.01 | 0.005 | — | — | — | — | — | −87 | |
| 113 | 0.01 | 0.01 | 0.01 | — | — | — | — | — | −87 | |
| 114 | 0.01 | 0.01 | 0.02 | — | — | — | — | — | −87 | |
| 115 | 0.01 | 0.01 | 0.03 | — | — | — | — | — | −87 | |
| 116 | 0.01 | 0.01 | 0.04 | — | — | — | — | — | −87 | |
| 117 | 0.01 | 0.01 | 0.05 | — | — | — | — | — | −86 | |
| 118 | 0.01 | 0.01 | — | 0 | — | — | — | — | −86 | |
| 119 | 0.01 | 0.01 | — | 0.01 | — | — | — | — | −87 | |
| 120 | 0.01 | 0.01 | — | 0.02 | — | — | — | — | −87 | |
| 121 | 0.01 | 0.01 | — | 0.03 | — | — | — | — | −87 | |
| 122 | 0.01 | 0.01 | — | 0.06 | — | — | — | — | −87 | |
| 123 | 0.01 | 0.01 | — | 0.1 | — | — | — | — | −86 | |
| 124 | 0.01 | 0.01 | 0.02 | 0.03 | — | — | — | — | −87 | |
| 125 | 0.01 | 0.01 | — | — | 0 | — | — | — | −86 | |
| 126 | 0.01 | 0.01 | — | — | 0.02 | — | — | — | −87 | |

TABLE 7-continued

| No. | SiO$_2$ (wt %) | CaO (wt %) | Nb$_2$O$_5$ (wt %) | Ta$_2$O$_5$ (wt %) | SnO$_2$ (wt %) | TiO$_2$ (wt %) | In$_2$O$_3$ (wt %) | Sb$_2$O$_3$ (wt %) | THD (dB) | Note |
|---|---|---|---|---|---|---|---|---|---|---|
| 127 | 0.01 | 0.01 | — | — | 0.075 | — | — | — | −87 | |
| 128 | 0.01 | 0.01 | — | — | 0.15 | — | — | — | −87 | |
| 129 | 0.01 | 0.01 | — | — | 0.3 | — | — | — | −87 | |
| 130 | 0.01 | 0.01 | — | — | 0.5 | — | — | — | −86 | |
| 131 | 0.01 | 0.01 | 0.02 | — | 0.15 | — | — | — | −87 | |
| 132 | 0.01 | 0.01 | — | — | — | 0 | — | — | −86 | |
| 133 | 0.01 | 0.01 | — | — | — | 0.02 | — | — | −87 | |
| 134 | 0.01 | 0.01 | — | — | — | 0.075 | — | — | −87 | |
| 135 | 0.01 | 0.01 | — | — | — | 0.15 | — | — | −87 | |
| 136 | 0.01 | 0.01 | — | — | — | 0.3 | — | — | −87 | |

TABLE 8

| No. | SiO$_2$ (wt %) | CaO (wt %) | Nb$_2$O$_5$ (wt %) | Ta$_2$O$_5$ (wt %) | SnO$_2$ (Wt %) | TiO$_2$ (wt %) | In$_2$O$_3$ (wt %) | Sb$_2$O$_3$ (wt %) | THD (dB) | Note |
|---|---|---|---|---|---|---|---|---|---|---|
| 137 | 0.01 | 0.01 | — | — | — | 0.5 | — | — | −85 | Example |
| 138 | 0.01 | 0.01 | 0.02 | — | — | 0.15 | — | — | −87 | |
| 139 | 0.01 | 0.01 | — | — | — | — | 0 | — | −86 | |
| 140 | 0.01 | 0.01 | — | — | — | — | 0.02 | — | −87 | |
| 141 | 0.01 | 0.01 | — | — | — | — | 0.075 | — | −87 | |
| 142 | 0.01 | 0.01 | — | — | — | — | 0.15 | — | −87 | |
| 143 | 0.01 | 0.01 | — | — | — | — | 0.3 | — | −87 | |
| 144 | 0.01 | 0.01 | — | — | — | — | 0.5 | — | −87 | |
| 145 | 0.01 | 0.01 | 0.02 | — | — | — | 0.15 | — | −87 | |
| 146 | 0.01 | 0.01 | — | — | — | — | — | 0 | −86 | |
| 147 | 0.01 | 0.01 | — | — | — | — | — | 0.01 | −87 | |
| 148 | 0.01 | 0.01 | — | — | — | — | — | 0.05 | −87 | |
| 149 | 0.01 | 0.01 | — | — | — | — | — | 0.1 | −87 | |
| 150 | 0.01 | 0.01 | — | — | — | — | — | 0.15 | −85 | |
| 151 | 0.01 | 0.01 | 0.02 | — | — | — | — | 0.01 | −87 | |
| 152 | 0.01 | 0.01 | 0.06 | — | — | — | — | — | −84 | Comparative |
| 153 | 0.01 | 0.01 | 0.08 | — | — | — | — | — | −83 | Example |
| 154 | 0.01 | 0.01 | — | 0.15 | — | — | — | — | −84 | |
| 155 | 0.01 | 0.01 | — | 0.3 | — | — | — | — | −83 | |
| 156 | 0.01 | 0.01 | — | — | 0.7 | — | — | — | −84 | |
| 157 | 0.01 | 0.01 | — | — | 1 | — | — | — | −82 | |
| 158 | 0.01 | 0.01 | — | — | — | 0.7 | — | — | −83 | |
| 159 | 0.01 | 0.01 | — | — | — | 1 | — | — | −80 | |
| 160 | 0.01 | 0.01 | — | — | — | — | 0.7 | — | −84 | |
| 161 | 0.01 | 0.01 | — | — | — | — | 1 | — | −81 | |
| 162 | 0.01 | 0.01 | — | — | — | — | — | 0.2 | −83 | |
| 163 | 0.01 | 0.01 | — | — | — | — | — | 0.3 | −82 | |

Table 7 and Table 8 indicate examples of the THD characteristics with respect to contents of Nb$_2$O$_5$, Ta$_2$O$_5$, SnO$_2$, TiO$_2$, In$_2$O$_3$ and Sb$_2$O$_3$. In Table 7 and Table 8, the main components are Fe$_2$O$_3$: 52.9 mol %, MnO: 23.9 mol % and ZnO: 23.2 mol %. In the Table 7 and Table 8, the Samples No. 111 to No.151 are examples of the present invention and the Samples No. 152 to No. 163 are comparative examples.

As is obvious from Table 7 and Table 8, in a range of Nb$_2$O$_5$: 0 to 0.050 wt % (excluding 0), Ta$_2$O$_5$: 0 to 0.100 wt % (excluding 0), SnO$_2$: 0 to 0.500 wt % (excluding 0), TiO$_2$: 0 to 0.500 wt % (excluding 0), In$_2$O$_3$: 0 to 0.500 wt % (excluding 0) and Sb$_2$O$_3$: 0 to 0.150 wt % (excluding 0), any of the sub components Nb$_2$O$_5$, Ta$_2$O$_5$, SnO$_2$, TiO$_2$, In$_2$O$_3$ and Sb$_2$O$_3$ are effective to make the THD still smaller by being added. Thereby, the THD exhibited a small value of −85 dB or less in all cases, and furthermore, the minimum value of −87 dB could be attained in some cases. On the other hand, when they were excessively added, the THD deteriorated in all cases.

The effect of reducing the THD by adding the respective second sub components Nb$_2$O$_5$, Ta$_2$O$_5$, SnO$_2$, TiO$_2$, In$_2$O$_3$ and Sb$_2$O$_3$ by suitable amounts is considered to be caused by an acceleration of sintering as a result of adding them by suitable amounts while coexisting with SiO$_2$ and CaO. Also, the deterioration of the THD by an excessive adding is considered to be caused by abnormal grain growth of crystal, formation irregularity in crystal grain, an increase of an stress on inside crystal grain, etc.

SAMPLES NO. 171 TO NO. 175 (EXAMPLES) AND SAMPLES NO. 170 AND NO. 176 (COMPARATIVE EXAMPLES)

Except for setting MnO to 24.0 mol %, ZnO to 23.2 mol % and Fe$_2$O to 52.8 mol % and containing CoO by 0 wt %, 0.02 wt %, 0.05 wt %, 0.10 wt %, 0.25 wt %, 0.50 wt % and 1.00 wt % as in Table 1, the magnetic cores for a transformer were formed in the same way as in the Sample No. 1 (Samples No. 170 to No. 176). Except for changing the voltage on both sides of the primary coil of the transformer from 1.8V to 2.5V and changing the measurement temperature to −40° C., −30° C., −15° C., 0° C., 25° C., 40° C., 60° C. and 85° C., the THD experiment was conducted in the same way as in the Sample No. 1.

Figure 4A:
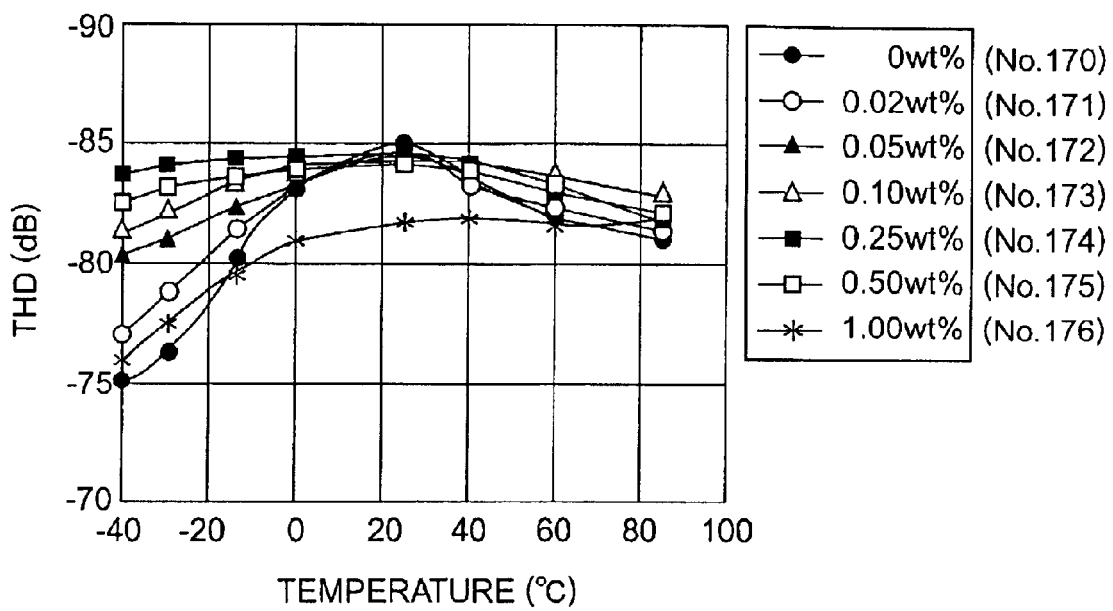
FIG. 4A is a graph of temperature dependency of the THD in other plurality of embodiments of the present invention.
Figure 4B:
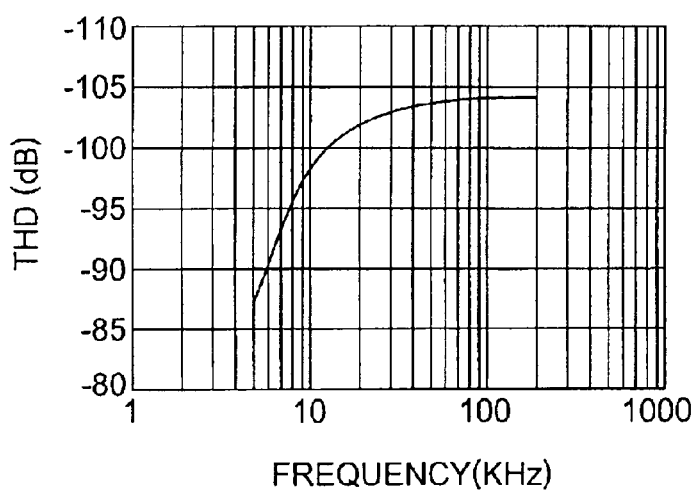
FIG. 4B is a graph of broad frequency characteristics of the THD in other embodiments of the present invention.

The results are shown in Table 9. FIG. 4A is a graph of measurement values shown in Table 9. Also, FIG. 4B shows frequency characteristics of the THD in the Sample No. 174 (Co: 0.25 wt %).

TABLE 9

| No. | 170 | 171 | 172 | 173 | 174 | 175 | 176 |
|---|---|---|---|---|---|---|---|
| Temperature (° C.) | | | | THD (dB) | | | |
| | 0 wt % | 0.02 wt % | 0.05 wt % | 0.10 wt % | 0.25 wt % | 0.50 wt % | 1.00 wt % |
| −40 | −75.1 | −77 | −80.4 | −81.1 | −83.7 | −82.7 | −75.8 |
| −30 | −76.2 | −79 | −81 | −82.1 | −84 | −83.3 | −77.5 |
| −15 | −79.9 | −81.4 | −82.4 | −83.3 | −84.2 | −83.6 | −79.6 |
| 0 | −83.2 | −83.5 | −83.4 | −84 | −84.4 | −84 | −81 |
| 25 | −85 | −84.6 | −84.3 | −84.6 | −84.5 | −84.1 | −81.7 |
| 40 | −83.6 | −83.3 | −83.8 | −84.3 | −84.2 | −83.9 | −81.9 |
| 60 | −81.9 | −82.3 | −83 | −83.6 | −83.3 | −83.2 | −81.7 |
| 85 | −81.1 | −81.4 | −82.4 | −83 | −82.2 | −82.1 | −81.7 |
| Minimum Value (dB) | −85 | −84.6 | −84.3 | −84.6 | −84.5 | −84.1 | −81.9 |
| Maximum Value (dB) | −75.1 | −77 | −80.4 | −81.1 | −82.2 | −82.1 | −75.8 |
| Maximum − Minimum (dB) | 9.9 | 7.6 | 3.9 | 3.5 | 2.3 | 2 | 6.1 |
| Minimum/Maximum (%) | 13.2 | 9.9 | 4.9 | 4.3 | 2.8 | 2.4 | 8 |
| Note | Comparative Example | | Example | | | | Comparative Example |

From Table 9 and FIG. 4A, the followings are clear. In the case of containing Co oxide in a range of 0.02 to 0.05 wt % in CoO conversion, the state of changing of the THD could be made small in wide temperature range of −40 to +85° C. comparing with the case of being added no CoO. It is proved that in the case of containing less than 0.02 wt %, the effect was small, furthermore, in the case of 1.00 wt %, the THD became large in a wider temperature range than in the case of adding no CoO. As explained above, it is proved that when the adding amount of CoO is too small as less than 0.02 wt %, the effect of reducing the THD in a wide temperature range is small, while when CoO is excessively added as 1.00 wt % or more, the THD deteriorates adversely. Accordingly, it is proved that the case of adding by 0.02 to 0.50 wt % in CoO conversion is effective to lessen the change of THD in a wide temperature range without lowering a peak value of the THD.

Also, from FIG. 4A, in the examples of the present invention, it is proved that the temperature change rate of the THD can become a flat state almost without lowering the peak value of the THD around 25° C. and the THD is improved than in the case where the adding amount of Coo is 0.

Furthermore, as is clear from Table 9, a difference value (dB) of the maximum value and the minimum value of the THD in the case of adding no CoO is as large as 9.9 dB and the ratio (minimum/maximum (%)) is as large as 13.2%. However, it is proved that only by adding 0.02 wt % of CoO, the THD in low temperature range of −40° C. side is improved, the difference (dB) of the maximum value and the minimum value of the THD decreases to 7.6 dB and the ratio is improved to be 9.9%.

When the adding amount of CoO is 0.05 to 0.50 wt %, not only decreasing the THD to as small as −80.0 dB or less, but the difference (dB) of the maximum value and the minimum value of the THD can be improved to 3.9 dB or less.

Furthermore, when the adding amount is 0.25 to 0.50 wt %, not only making the THD extremely small as −82.1 dB or less in all wide temperature ranges, the difference of the maximum value and the minimum value of the THD can be improved to 2.0 to 2.3 dB, that is, the THD can be made flat in the wide temperature range.

As explained above, by dissolving 0.02 to 0.50 wt % of Co in CoO conversion in Mn—Zn based ferrite, the THD can be made small in the wide temperature range.

SAMPLES NO. 180 TO NO. 192 (EXAMPLES)

Except for changing the composition of $Fe_2O_3$, MnO and ZnO as main components in the above Sample No. 171 (CoO: 0.02 wt %) to that as shown in Table 10, the magnetic cores for a transformer were formed in the same way as in the Sample No. 171, and the THD measurement was carried out at 25° C. Also, losses in the AC magnetic field of the magnetic cores of the transformer were also measured under the same conditions as in the THD measurement. The measurement results are shown in Table 10.

TABLE 10

| | Main component Composition (mol %) | | | Magnetic Core Loss (kw/m³) | THD (dB) | |
|---|---|---|---|---|---|---|
| No. | $Fe_2O_3$ | MnO | ZnO | (5 kHz) | 5 kHz | Note |
| 180 | 52.9 | 23.9 | 23.2 | 1 | −85 | Example |
| 181 | 52.7 | 24 | 23.3 | 1 | −85 | |
| 182 | 52.8 | 24.1 | 23.1 | 1 | −85 | |
| 183 | 53.5 | 26.2 | 20.3 | 1 | −84 | |
| 184 | 53.3 | 26.3 | 20.4 | 1 | −84 | |
| 185 | 53.4 | 26.4 | 20.2 | 1 | −84 | |
| 186 | 53.3 | 23.1 | 23.6 | 1.1 | −83 | |
| 187 | 53.1 | 23.2 | 23.7 | 1.1 | −83 | |
| 188 | 53.2 | 23.3 | 23.5 | 1.1 | −83 | |
| 189 | 54 | 32.7 | 13.3 | 1.1 | −83 | |
| 190 | 52.8 | 24.5 | 22.7 | 1.1 | −82 | |
| 191 | 52.9 | 25.5 | 21.6 | 1.1 | −81 | |
| 192 | 54 | 33 | 13 | 1.1 | −80 | |

From Table 10, the followings became apparent. Namely, in the case of a magnetic core comprised of an Mn—Zn based ferrite material having a main component composition containing MnO: 22.0 to 34.5 mol % (particularly 23 to 33 mol %) and ZnO: 12.0 to 25.0 mol % (particulary 13 to 24 mol %) and the rest of substantially $Fe_2O_3$, it became apparent that the losses in the AC magnetic field became small, consequently, the THD of the transformer became as small as −80 dB or less in the broad frequency band.

Also in Table 10, by referring to the Samples No. 180 to No. 182, it was proved that the THD characteristics of the transformer became a particularly excellent value of −85 dB or less in the broad frequency band in the composition of MnO: 23.8 to 24.2 mol %, ZnO: 23.0 to 23.4 mol % and $Fe_2O_3$: 52.6 to 53.0 mol %.

Furthermore, by referring to the Samples No. 183 to No. 185, it was proved that the THD characteristics of the transformer also became a particularly excellent value of −84 dB or less in the broad frequency band in the composition of MnO: 26.1 to 26.5 mol %, ZnO: 20.1 to 20.5 mol % and $Fe_2O_3$: 53.2 to 53.6 mol %.

Also, by referring to the Samples No. 186 to No. 188, it was proved that the THD characteristics of the transformer also became a particularly excellent value of −83 dB or less in the broad frequency band in the composition of MnO: 23.0 to 23.4 mol %, ZnO: 23.4 to 23.8 mol % and $Fe_2O_3$: 53.0 to 53.4 mol %.

What is claimed is:

1. An Mn—Zn based ferrite composition having a main component comprised of $Fe_2O_3$: 51.5 to 54.5 mol % and ZnO: 19.0 to 27.0 mol % and the rest of substantially MnO, and a first sub component comprised of 0.002 to 0.040 wt % of $SiO_2$, 0.003 to 0.045 wt % of CaO and 0.010 wt % or less of P with respect to 100 wt % of said main component, wherein a sintered density of a sintered body of the ferrite composition is 4.90 g/cm$^3$ or more, an average crystal grain diameter of the sintered body is 7 μm to 40 μm and a composition difference of ZnO on a surface of the sintered body and inside of the sintered body is 1.0 mol % or less.

2. An Mn—Zn based ferrite composition having a main component comprised of $Fe_2O_3$: 51.5 to 54.5 mol % and ZnO: 19.0 to 27.0 mol % and the rest of substantially MnO, and a first sub component comprised of 0.002 to 0.040 wt % of $SiO_2$, 0.003 to 0.045 wt % of CaO and 0.010 wt % or less of P with respect to 100 wt % of said main component, and a second sub component comprised of at least one selected from 0.050 wt % or less (excluding 0) of $Nb_2O_5$, 0.100 wt % or less (excluding 0) of $Ta_2O_5$, 0.500 wt % or less (excluding 0) of $SnO_2$, 0.500 wt % or less (excluding 0) of $TiO_2$, 0.500 wt % or less (excluding 0) of $In_2O_3$ and 0.150 wt % or less (excluding 0) of $Sb_2O_3$ with respect to 100 wt % of said main component, wherein a sintered density of a sintered body of the ferrite composition is 4.90 g/cm$^3$ or more, an average crystal grain diameter is 7 μm to 40 μm and a composition difference of ZnO on a surface of the sintered body and inside of the sintered body is 1.0 mol % or less.

3. The Mn—Zn based ferrite composition as set forth in claim 2, further having a third sub component comprised of 0.02 to 0.50 wt % of Co oxide in CoO conversion with respect to 100 wt % of said main component.

4. The Mn—Zn based ferrite composition as set forth in claim 2, further having a third sub component comprised of 0.05 to 0.50 wt % of Co oxide in CoO conversion with respect to 100 wt % of said main component.

5. An Mn—Zn based ferrite composition having a main component comprised of MnO: 23.8 to 24.2 mol %, ZnO: 23.0 to 23.4 mol % and $Fe_2O_3$: 52.6 to 53.0 mol %, and a sub component having 0.02 to 0.5 wt % of Co oxide in CoO conversion with respect to 100 wt % of said main component.

6. An Mn—Zn based ferrite composition having a main component comprised of MnO: 26.1 to 26.5 mol %, ZnO: 20.1 to 20.5 mol % and $Fe_2O_3$: 53.2 to 53.6 mol %, and a sub component having 0.02 to 0.5 wt % of Co oxide in CoO conversion with respect to 100 wt % of said main component.

7. An Mn—Zn based ferrite composition having a main component comprised of MnO: 23.0 to 23.4 mol %, ZnO: 23.4 to 23.8 mol % and $Fe_2O_3$: 53.0 to 53.4 mol %, and a sub component having 0.02 to 0.5 wt % of Co oxide in CoO conversion with respect to 100 wt % of said main component.

8. A magnetic core for a transformer having, a main component comprised of $Fe_2O_3$: 51.5 to 54.5 mol %, ZnO: 19.0 to 27.0 mol % and the rest of substantially MnO, and a first sub component having 0.002 to 0.040 wt % of $SiO_2$, 0.003 to 0.045 wt % of CaO and 0.010 wt % or less of P with respect to 100 wt % of said main component, wherein a sintered density of a sintered body of the magnetic core is 4.90 g/cm$^3$ or more, an average crystal grain diameter of the sintered body is 7 μm to 40 μm and a composition difference of ZnO on a surface of the sintered body and inside of the sintered body is 1.0 mol % or less.

9. A magnetic core for a transformer having a main component comprised of $Fe_2O_3$: 51.5 to 54.5 mol % and ZnO: 19.0 to 27.0 mol % and the rest of substantially MnO, and a first sub component having 0.002 to 0.040 wt % of $SiO_2$, 0.003 to 0.045 wt % of CaO and 0.010 wt % or less of P with respect to 100 wt % of said main component, a second sub component comprised of at least one selected from 0.050 wt % or less (excluding 0) of $Nb_2O_5$, 0.100 wt % or less (excluding 0) of $Ta_2O_5$, 0.500 wt % or less (excluding 0) of $SnO_2$, 0.500 wt % or less (excluding 0) of $TiO_2$, 0.500 wt % or less (excluding 0) of $In_2O_3$ and 0.150 wt % or less (excluding 0) of $Sb_2O_3$ with respect to 100 wt % of said main component, wherein a sintered density of a sintered body of the magnetic core is 4.90 g/cm$^3$ or more, an average crystal grain diameter of the sintered body is 7 μm to 40 μm and a composition difference of ZnO between the surface of the sintered body and inside of the sintered body is 1.0 mol % or less.

10. A magnetic core for a transformer having a main component comprised of $Fe_2O_3$: 51.5 to 54.5 mol % and ZnO: 19.0 to 27.0 mol % and the rest of substantially MnO, and a first sub component having 0.002 to 0.040 wt % of $SiO_2$, 0.003 to 0.045 wt % of CaO and 0.010 wt % or less of P with respect to 100 wt % of said main component, and a further sub component comprised of 0.02 to 0.50 wt % of Co oxide in CoO conversion with respect to 100 wt % of said main component.

11. A magnetic core for a transformer having a main component comprised of $Fe_2O_3$: 51.5 to 54.5 mol % and ZnO: 19.0 to 27.0 mol % and the rest of substantially MnO, and a first sub component having 0.002 to 0.040 wt % of $SiO_2$, 0.003 to 0.045 wt % of CaO and 0.010 wt % or less of P with respect to 100 wt % of said main component, and a further sub component comprised of 0.05 to 0.50 wt % of Co oxide in CoO conversion with respect to 100 wt % of said main component.

12. A magnetic core for a transformer having a main component comprised of MnO: 23.8 to 24.2 mol % and ZnO: 23.0 to 23.4 mol % and $Fe_2O_3$: 52.6 to 53.0 mol %, and a sub component having 0.02 to 0.5 wt % of Co oxide in CoO conversion with respect to 100 wt % of said main component.

13. A magnetic core for a transformer having a main component comprised of MnO: 26.1 to 26.5 mol %, ZnO: 20.1 to 20.5 mol % and $Fe_2O_3$: 53.2 to 53.6 mol %, and a sub component having 0.02 to 0.5 wt % of Co oxide in CoO conversion with respect to 100 wt % of said main component.

14. A magnetic core for a transformer having a main component comprised of MnO: 23.0 to 23.4 mol %, ZnO: 23.4 to 23.8 mol % and $Fe_2O_3$: 53.0 to 53.4 mol %, and a sub component having 0.02 to 0.5 wt % of Co oxide in CoO conversion with respect to 100 wt % of said main component.

15. A method of producing the Mn—Zn based ferrite composition of claim 1, including the step of firing said ferrite composition at a firing holding temperature of 1240 to 1340 C in a sintering process.

16. A method of producing the Mn—Zn based ferrite composition of claim 2, including the step of firing said ferrite composition at a firing holding temperature of 1240 to 1340 C in a sintering process.

17. A method of producing the magnetic core for a transformer of claim 8, including the step of firing said magnetic core for a transformer at a firing holding temperature of 1240 to 1340° C. in a sintering process.

18. A method of producing the magnetic core for a transformer of claim 9, including the step of firing said magnetic core for a transformer at a firing holding temperature of 1240 to 1340° C. in a sintering process.

* * * * *